US 6,640,307 B2

(12) United States Patent
Viets et al.

(10) Patent No.: US 6,640,307 B2
(45) Date of Patent: *Oct. 28, 2003

(54) SYSTEM AND METHOD FOR CONTROLLING ACCESS TO DOCUMENTS STORED ON AN INTERNAL NETWORK

(75) Inventors: Richard R. Viets, Naples, FL (US); David G. Motes, Bonita Springs, FL (US); Paula Budig Greve, St. Anthony, MN (US); Wayne W. Herberg, Rush City, MN (US)

(73) Assignee: Secure Computing Corporation, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,775

(22) Filed: Dec. 1, 2000

(65) Prior Publication Data

US 2002/0091532 A1 Jul. 11, 2002

Related U.S. Application Data

(63) Continuation of application No. 09/024,576, filed on Feb. 17, 1998, now Pat. No. 6,357,010.

(51) Int. Cl.[7] .................... G06F 12/14; G06F 15/173; H04L 12/00; H04L 9/00
(52) U.S. Cl. .................... 713/201; 713/200; 709/225
(58) Field of Search .................... 713/201, 200; 709/225

(56) References Cited

U.S. PATENT DOCUMENTS

| 3,956,615 A | 5/1976 | Anderson et al. | 235/61.7 B |
| 4,177,510 A | 12/1979 | Appell et al. | 364/200 |
| 4,584,639 A | 4/1986 | Hardy | 364/200 |
| 4,621,321 A | 11/1986 | Boebert et al. | 364/200 |

(List continued on next page.)

FOREIGN PATENT DOCUMENTS

| EP | 0697662 A1 | 2/1996 | G06F/12/14 |
| EP | 0 743 777 A2 | 11/1996 | H04L/29/06 |
| EP | 0811939 A2 | 12/1997 | G06F/17/30 |
| WO | 96/13113 | 5/1996 | H04L/29/06 |

(List continued on next page.)

OTHER PUBLICATIONS

International Search Report, PCT Application No. PCT/US 95/12681, 8 p., (mailed Apr. 9, 1996).
Ancilotti, P., et al., "Language Features for Access Control", *IEEE Transactions on Software Engineering*, SE–9, 16–25, (Jan. 1983).

(List continued on next page.)

*Primary Examiner*—Jeffrey Gaffin
*Assistant Examiner*—Tanh Q Nguyen
(74) *Attorney, Agent, or Firm*—Schwegman, Lundberg, Woessner & Kluth, P.A.

(57) ABSTRACT

A system and method of limiting access from an external network to documents stored on an internal network. A client list is built in which each client is assigned to one or more roles. Each role has access to one or more documents as defined on a document list. A request from an external network is reviewed and, if possible, the request is associated with a client on the client list. The requested document is then compared to the document list associated with the client's role and, if the requested document is in the list of documents available to a client in the client's role, the requested document is fetched, cleaned and sent to the client.

17 Claims, 7 Drawing Sheets

U.S. PATENT DOCUMENTS

| | | | | |
|---|---|---|---|---|
| 4,701,840 | A | 10/1987 | Boebert et al. | 364/200 |
| 4,713,753 | A | 12/1987 | Boebert et al. | 364/200 |
| 4,914,568 | A | 4/1990 | Kodosky et al. | 364/200 |
| 5,124,984 | A | 6/1992 | Engel | 370/94.1 |
| 5,179,658 | A | 1/1993 | Izawa et al. | 395/164 |
| 5,204,812 | A | 4/1993 | Kasiraj et al. | 364/419 |
| 5,272,754 | A | 12/1993 | Boerbert | 380/25 |
| 5,276,735 | A | 1/1994 | Boebert et al. | 380/21 |
| 5,311,593 | A | 5/1994 | Carmi | 380/23 |
| 5,329,623 | A | 7/1994 | Smith et al. | 395/275 |
| 5,455,953 | A | 10/1995 | Russell | 395/739 |
| 5,544,321 | A | 8/1996 | Theimer et al. | 395/200.11 |
| 5,566,170 | A | 10/1996 | Bakke et al. | 370/60 |
| 5,586,260 | A | 12/1996 | Hu | 395/200.2 |
| 5,606,668 | A | 2/1997 | Shwed | 395/200.11 |
| 5,619,648 | A | 4/1997 | Canale et al. | 395/200.01 |
| 5,623,601 | A | 4/1997 | Vu | 395/187.01 |
| 5,636,371 | A | 6/1997 | Yu | 395/500 |
| 5,673,322 | A | 9/1997 | Pepe et al. | 380/49 |
| 5,684,951 | A | 11/1997 | Goldman et al. | 395/188.01 |
| 5,689,566 | A | 11/1997 | Nguyen | 380/25 |
| 5,701,137 | A | * 12/1997 | Kiernan et al. | 345/340 |
| 5,708,780 | A | 1/1998 | Levergood et al. | 395/200.12 |
| 5,784,566 | A | 7/1998 | Viavant et al. | 395/200.59 |
| 5,802,299 | A | * 9/1998 | Logan et al. | 709/218 |
| 5,819,271 | A | 10/1998 | Mahoney et al. | 707/9 |
| 5,826,029 | A | * 10/1998 | Gore, Jr. et al. | 709/227 |
| 5,864,683 | A | 1/1999 | Boebert et al. | 395/200.79 |
| 5,864,871 | A | * 1/1999 | Kitain et al. | 707/104 |
| 5,870,544 | A | 2/1999 | Curtis | 395/187.01 |
| 5,884,033 | A | 3/1999 | Duvall et al. | 395/200.36 |
| 5,884,312 | A | 3/1999 | Dustan et al. | 707/10 |
| 5,892,905 | A | 4/1999 | Brandt et al. | 395/187.01 |
| 5,903,732 | A | 5/1999 | Reed et al. | 395/200.59 |
| 5,911,143 | A | 6/1999 | Deinhart et al. | 707/103 |
| 5,913,024 | A | 6/1999 | Green et al. | 395/186 |
| 5,915,087 | A | 6/1999 | Hammond et al. | 395/187.01 |
| 5,918,013 | A | 6/1999 | Mighdoll et al. | 395/200.47 |
| 5,933,600 | A | 8/1999 | Shieh et al. | 395/200.49 |
| 5,950,195 | A | 9/1999 | Stockwell et al. | 707/4 |
| 5,961,601 | A | 10/1999 | Iyengar | 709/229 |
| 5,987,611 | A | 11/1999 | Freund | 713/201 |
| 6,023,765 | A | 2/2000 | Kuhn | 713/200 |
| 6,055,637 | A | * 4/2000 | Hudson et al. | 713/201 |
| 6,088,679 | A | 7/2000 | Barkley | 705/8 |

FOREIGN PATENT DOCUMENTS

| | | | | |
|---|---|---|---|---|
| WO | 97/13340 | 4/1997 | | H04L/9/00 |
| WO | 97/16911 | 5/1997 | | H04L/29/06 |
| WO | 97/26731 | 7/1997 | | H04L/9/00 |

OTHER PUBLICATIONS

Atkinson, R., "IP Authentication Header", Network Working Group, Request for Comment No. 1826, http/ds.internic.net/rfc/rfc1826.txt, 11 p., (Aug. 1995).

Atkinson, R., "IP Encapsulating Security Payload (ESP)", Network Working Group, Request for Comment No. 1827, http/ds.internic.net/rfc/rfc1827.txt, 12 p., (Aug. 1995).

Atkinson, R., "Security Architecture for the Internet Protocol", Network Working Group, Reqest for Comment No. 1825, http/ds.internic.net/rfc/rfc1825.txt, 21 p., (Aug. 1995).

Baclace, P.E., "Competitive Agents for Information Filtering", *Communications of the ACM*, 35, p. 50, (Dec. 1992).

Badger, L., et al., "Practical Domain and Type Enforcement for UNIX", *Proceedings of the 1995 Symposium on Security and Privacy*, p. 66–77, (May 1995).

Belkin, N.J., et al., "Information Filtering and Information Retrieval: Two Sides of the Same Coin?", *Communications of the ACM*, 35, 29–38, (Dec. 1992).

Bellovin, S.M., et al., "Network Firewalls", *IEEE Communications Magazine*, 32, 50–57, (Sep. 1994).

Bevier, W.R., et al., "Connection Policies and Controlled Interference", *Proceedings of the Eighth IEEE Computer Security Foundations Workshop*, Kenmare, Ireland, p. 167–176, (Jun. 13–15, 1995).

Boebert, W.E., et al., "Secure Ada Target: Issues, System Design, and Verification", *Proceedings of the IEEE Symposium on Security and Privacy*, Oakland, California, p. 59–66, (Apr. 22–24, 1985).

Boebert, W.E., et al., "Secure Computing: The Secure Ada Target Approach", *Scientific Honeyweller*, 6 (2), 42–58, (Jul., 1985).

Bowen, T.F., et al., "The Datacycle Architecture", *Communications of the ACM*, 35, 71–81, (Dec. 1992).

Bryan, J., "Firewalls For Sale", *BYTE*, 99–100, 102, 104, (Apr. 1995).

Cobb, S., "Establishing Firewall Policy", *IEEE*, 198–205, (1996).

Foltz, P.W., et al., "Personalized Information Delivery: An Analysis of Information Filtering Methods", *Communications of the ACM*, 35, 51–60, (Dec. 1992).

Gassman, B., "Internet Security, and Firewalls Protection on the Internet", *IEEE*, 93–107, (1996).

Goldberg, D., et al., "Using Collaborative Filtering to Wave an Information Tapestry", *Communications of the ACM*, 35, 61–70, (Dec. 1992).

Grampp, F.T., "UNIX Operating System Security", *AT&T Bell Laboratories Technical Journal*, 63, 1649–1672, (Oct. 1984).

Greenwald, M., et al., "Designing an Academic Firewall: Policy, Practice, and Experience with Surg", *IEEE*, 79–92, (1996).

Haigh, J.T., et al., "Extending the Nointerference Version of MLS for SAT", *Proceedings of the 1986 Symposium on Security and Privacy*, Oakland, CA, p. 232–239, (Apr. 7–9, 1986).

Kahan, J., "A capability based authorization model for the world–Wide Web", *Comuter Networks and ISDN Systems*, pp. 1055–1064, (1995).

Karn, P., et al., "The ESP DES–CBC Transforms", Network Working Group, Request for Comment No. 1829, http/ds.internic.net/rfc/rfc1829.txt, 9 p., (Aug. 1995).

Kent, S.T., "Internet Privacy Enhanced Mail", *Communications of the ACM*, 36, 48–60, (Aug. 1993).

Lampson, B.W., et al., "Dynamic Protection Structures", *AFIPS Conference Proceedings*, 35, 1969 Fall Joint Computer Conference, Las Vegas, NV, 27–38, (Nov. 18–20, 1969).

Lee, K.C., et al., "A Framework for Controlling Cooperative Agents", *Computer*, 8–16, (Jul. 1993).

Lodin, S.W., et al., "Firewalls Fend Off Invasions from the Net", *IEEE Spectrum*, 26–34, (Feb. 1998).

Loeh, S., "Architecturing Personalized Delivery of Multimedia Information", *Communications of the ACM*, 35, 39–50 (1992).

Loeb, S., et al., "Information Filtering", *Communications of the ACM*, 35, 26–28, (Dec. 1992).

Merenbloom, P., "Network 'Fire Walls' Safeguard LAN Data from Outside Intrusion", *Infoworld*, p. 69 & addnl page, (Jul. 25, 1994).

Metzger, P., et al., "IP Authentication using Keyed MD", Network Working Group, Request for Comments No. 1828, http/ds.internic.net/rfc/rfc1828.txt, 6 p., (Aug. 1995).

Obraczka, K., et al., "Internet Resource Discovery Services", *Computer*, 8–22, (Sep. 1993).

Peterson, L.L., et al., *In: Computer Networks*, Morgan Kaufmann Publishers, Inc., San Francisco, CA, p. 218–221, 284–286, (1996).

Press, L., "The Net: Progress and Oppurtunity", *Communications of the ACM*, 35, 21–25, (Dec. 1992).

Sandhu, R.S., et al., "Role–based Access Control Models", *Computer*, 38–47, (Feb., 1996).

Schroeder, M.D., et al., "A Hardware Architecture for Implementing Protection Rings", *Communications of the ACM*, 15, 157–170, (Mar. 1972).

Schwartz, M.F., "Internet Resource Discovery at the University of Colorado", *Computer*, 25–35, (Sep. 1993).

Smith, R.E., "Constructing a High Assurance Mail Guard", Secure Computing Corporation (Appeared in the Proceedngs of the National Computer Security Conference), 7 p., (1994).

Smith, R.E., "Sidewinder: Defense in Depth Using Type Enforcement", *International Journal of Network Management*, p. 219–229, (Jul.–Aug. 1995).

Stadnyk, T., et al., "Modeling User's Interests in Information Filters", *Communications of the ACM*, 35, 49–50, (Dec. 1992).

Stempel, C., "Automating the Creation of Information Filters", *Communications of the ACM*, 35, p. 48, (Dec. 1992).

Tari, Z., et al., "A Role–based Access Control for Intranet Security", *IEEE Internet Computing*, 24–34, (Sep./Oct., 1997).

Thomsen, D., "Type Enforcement: The New Security Model", *SPIE*, 2617, 143–150 (1995).

Vinter, S.T., et al., "Extended Discretionary Access Controls", *IEEE*, pp. 39–49, (1988).

Warrier, U.S., et al., "A Platform for Heterogeneous Interconnection Network Management", *IEEE Journal on Selected Areas in Communications*, 8, 119–126, (Jan. 1990).

White, L.J., et al., "A Firewall Concept for Both Control-Flow and Data–Flow in Regression Integration Testing", *IEEE*, 262–271, (1992).

Wolfe, A., "Honeywell Builds Hardware for Computer Security", *Electronics*, 14–15, 17, (Sep. 2, 1985).

Yialelis, N., et al., "Role–based Security for Distributed Object Systems", *Proceedings of Wet Ice '96*, 80–85, (1996).

\* cited by examiner

SYSTEM AND METHOD FOR CONTROLLING ACCESS TO DOCUMENTS STORED ON AN INTERNAL NETWORK

This application is a continuation of U.S. patent application Ser. No. 09/024,576, filed Feb. 17, 1998, now U.S. Pat. No. 6,357,010 issued Mar. 12, 2002.

BACKGROUND OF THE INVENTION

1. Field of the Invention

The present invention relates to systems and methods for controlling communication between networks, and in particular to a system and method for limiting access to documents stored on an internal network.

2. Background Information

Businesses today are acting cooperatively to achieve compatible business goals. For example, companies are using just-in-time manufacturing techniques to reduce overhead. To make this work, companies rely heavily on the ability of their suppliers to provide materials when needed.

At the same time, in this digital age business executives have become accustomed to receiving information from a number of sources both inside and outside the company almost instantaneously. They rely on such information to drive their day-to-day management decisions.

In order to provide outside organizations with relevant information in a timely manner, many companies have expanded their order-processing departments to handle increased call volumes. In this environment, outside partners call into the company's order-processing department to request specific information. This requires an employee to be available to answer calls, pull up information and verbally convey information to the partner. This option is very expensive, slow, and offers a poor level of service. What is needed is a system and method of streamlining the flow of information between partner companies while limiting access to company proprietary information.

The Internet provides one possible solution to this problem. The nature of the Internet makes it an ideal vehicle for organizations to communicate and share information. The Internet offers low cost universal access to information. Because of this, Internet transactions are expected to more than quadruple over the next two years, and partner communications via the Internet will almost double. Companies have begun to look to the Internet as a medium allowing quick, easy and inexpensive to business partners. To date, however, their Internet options have been limited.

One solution is to give business partners access to the company internal network. Companies are hesitant to do this, however, since such access, if abused, can lead to the disclosure of company sensitive information.

Another solution is to replicate necessary information to a web server located outside the company's firewall. Such an approach does allow organizations direct access to the information while at the same time limiting their access to company sensitive information. For this environment to work, however, the MIS department must manually transfer information from the internal network to the external server. Therefore, while this option offers organizations direct access to necessary data, that information can be 24 to 48 hours old. When dealing with just-in-time inventory levels and large dollar amounts, 24 hours is too late. This option also creates a bottleneck in MIS, redundancy of data, and decreased data integrity.

What is needed is a system and method for giving controlled access to designated documents stored on the internal network while restricting access to company sensitive information.

SUMMARY OF THE INVENTION

According to one aspect of the present invention, in a document control system including an internal network, an external interface, and a document server connected to the internal network and to the external interface, wherein the document server contains a plurality of go lists, wherein each go list is associated with a role and wherein each go list indicates if a client assigned to that role has access to a document in a document list, a system and method of modifying a go list is described. Client roles are defined client roles. Data Owners are defined, wherein each Data Owner sets access rights for one or more client roles, wherein the plurality of Data Owners include a first Data Owner, wherein the first Data Owner sets access rights for the first client role and not for the second client role. A go list for a client role associated with the first Data Owner is accessed and displayed as a directory tree. The directory tree is modified and mapped into a revised go list. The revised go list is saved to the document server.

BRIEF DESCRIPTION OF THE DRAWINGS

In the drawings, where like numerals refer to like components throughout the several views.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

As noted above, corporations today are required by customers to deliver information such as price changes, new product data, manufacturing data, and customer support electronically. Competition is driving firms to work with partners through tight connections to internal systems. Allowing access, however, to such data in an efficient, manageable, and secure manner presents challenges. Companies go to great lengths to set up order processing departments and replicate large quantities of internal data to an external Internet server. These efforts are not only inefficient, but usually result in redundancy of data, decreased network integrity, and a bottleneck in the MIS department.

The present invention solves this problem by allowing specified external users controlled, customized, and secure access to the company's intranet without complex network infrastructure modifications. Further, the present invention permits one to control the parts of a Web server that are accessible to a Business Partner with only minimal intervention by IS personnel. (The term "Business Partner" is used in the following discussion to describe an external user who needs access to data such as Web pages which are not generally available to the public, but who also should not have unlimited to a company's intranet Web services.)

Figure 1:
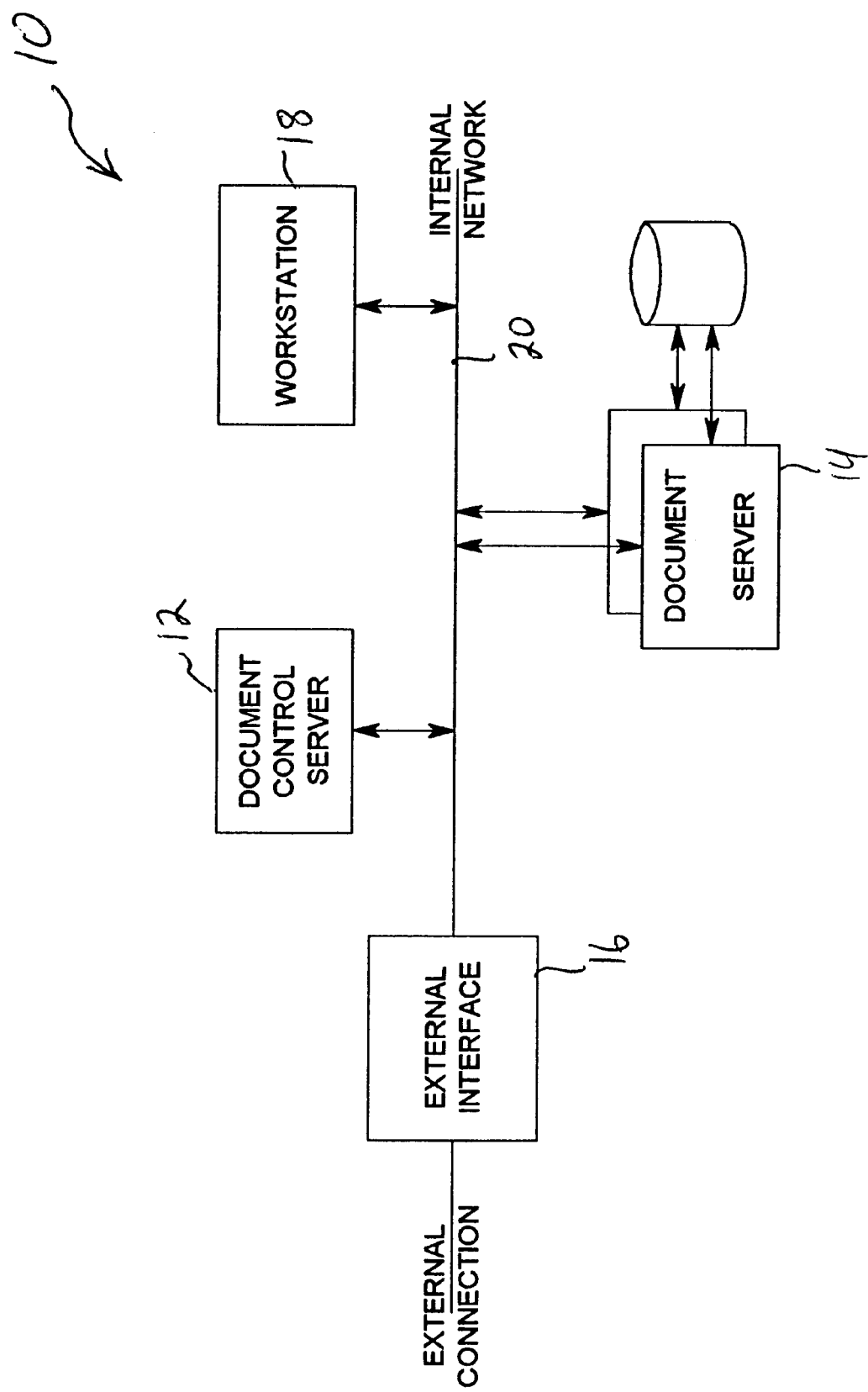
FIG. 1 shows a document access system.

A document access system for giving controlled access to designated documents stored on the internal network while restricting access to company sensitive information is shown in FIG. 1. In FIG. 1 document access system 10 includes a document control server 12, a document server 14, an external interface 16 and one or more internal workstations 18. Document control server 12, document server 14, external interface 16 and internal workstations 18 are interconnected via internal network 20. Document server 14 reads and writes documents to storage 20. Requests for documents arrive at external interface 16 and are forwarded to document control server 12 for execution. In one embodiment external interface 16 includes a router used to form an Internet connection. In another embodiment, external interface 16 includes a direct connection interface such as formed by one or more modems used for direct dial-up by business partners wishing to access their data.

Figure 2:
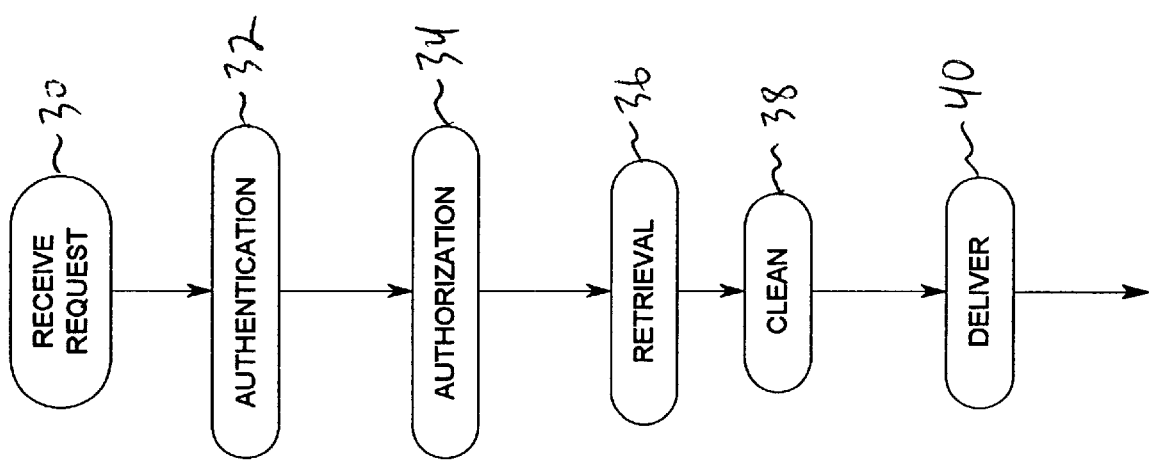
FIG. 2 is a flow diagram illustrating operations performed by the document access system of FIG. 1.

In one embodiment, as is illustrated in FIG. 2, at 30 document control server 12 receives a document request from the external interface for a first document. At 32, document control server 12 determines a user associated with the document request and authenticates the user. At 34, system 10 checks to see if the user is authorized to access the document requested. If so, at 36, system 10 retrieves the document from document server 14, cleans the document at 38 and, at 40, forwards the clean version of the document to the user. One embodiment of such a system and method is described next for a HyperText Transfer Protocol (HTTP) system.

When an HTTP or HTTPS connection request comes into document control server 12 there are three critical functions that must take place prior to returning the requested Web page: authentication, authorization, and internal connection. If either of the first two functions fail, the internal connection is not made. Then, once the internal connection has been made, document control server 12 must parse and "clean" the Web page prior to returning it to the requesting user.

Authentication

Authentication is fairly straight-forward and is of course visible to the end user. Following the HTTP protocol, when a user first enters a Uniform Resource Locator (URL) from their browser and the request is received at 30 (see FIG. 2) at server 12, a check is made at 32 for authentication. If basic authentication is being used, a check is made for authentication information in the HTTP header. If no username and password are found, the server returns a 401 error to the browser, telling the browser it needs to authenticate. The browser then pops up the box prompting the user to enter a username and password. When the HTTP request comes into the server, document control server 12 parses the username and password, comparing against its internal database of users and if it finds a match, lets control proceed onto the authorization step. If no match is found, document control server 12 returns an error code back to the Web server it is running under (e.g., Internet Information Server or Netscape Enterprise Server) and the server will once again send back a 401 requesting the username and password. This process can happen 3 times and then the server will deny access. In one embodiment this authentication check is checked against a data base of known users as opposed to letting the Web Server check against a user database it may have.

Authorization

Once document control server 12 has authenticated the request, it must, at 34, determine if the user is authorized to get to the URL they have requested. This authorization will fail if the URL the user requested is not in the list of "allowed" URLs associated with the user. In one embodiment, each user is assigned one or more roles. Each role has access to a set of allowed URLs associated with that role.

In one embodiment each user has one or more roles associated with their user ID. For instance, they could be in the Marketing role, as well as the Engineering role. In one such embodiment, each role is directly associated with an internal server; you can only define one role for each server. This means you could not have the Marketing role and the Engineering role going to the same physical internal server. Such an approach can simplify system design.

In another embodiment, more than one roles may be assigned to each internal server. For example, a manufacturer may have all his reseller information on one server. One role, however, contains international resellers and another role contains domestic resellers. In such an embodiment, it would be advantageous to be able to define different sets of URLs on a single document server 14 that would allow for the different roles.

To complete the authorization portion, document control server 12 scans the list of allowed URLs for each role the user is in until it finds a match. If no match is made, an error condition is returned to the Web server indicating access is denied and the Web server in turn sends the appropriate error back to the browser.

An important and unique point to make here is that document control server 12 must translate the URL prior to doing its search for a match on the URL. When an external business partner (user) enters the URL, they enter a URL where the first part of the URL points document control server 12 and the second portion is the 'role' associated with that URL e.g., https://www.<server ID>.com/Engineering/Standards/http_protocol.html where https=Secure http connection using SSL www.<server ID>.com=DNS name of document control server 12 (this name is unique to the customer installation)

/Engineering=role associated with this particular URL

/Standards/http_protocol.html=actual web page on the internal web server

If the real intranet web server associated with the Engineering role were engineer.abcd.com, then the translated URL that document control server 12 would search for is:

engineer.abcd.com/Standards/http_protocol.html

Note, the next two sections, Intranet connection and parsing the page, are entirely invisible to the end user.

Intranet Connection

If both the authentication and authorization phases completed successfully, document control server 12 will open a TCP connection to the appropriate intranet server (engineer.abcd.com from the above example). Once the TCP connection has been made, document control server 12 generates an http request for the specific web page. The intranet server locates and returns the requested web page to document control server 12.

Parsing the Page

The pages returned by the intranet are categorized as either text or non-text. Examples of the latter are graphics, such as GIF or JPEG documents, sound objects, or executable objects, such as Java applets. Non-text pages are not parsed and forwarded back to the client browser unchanged. Text documents, such as HTML formatted pages, however, contain embedded links that may need to be translated into their external equivalent. Embedded links fall into 3 groups, some of which require translation, while others don't: relative path links, server path links and absolute path links.

Relative path links, which are of the form subdir/page.html, don't require translation because the browser will prepend the path based on the referrer's page. For example, if the referrer's page was at:

http://www.document_control_server.com/Engineering/Standards/http_protocol.htm 1 and the relative link was ssl_protocol.html, then the browser would prepend http://www.document_control_server.com/Engineering/Standards/to the link.

Server path links take the form of /Specification/wheel.html and require translation. This type of link points to a page that resides on the same server as the referrer's page, but with an absolute path starting at the root directory of the server. Assuming the same referrer's page as in the paragraph above, the translated link would be /Engineering/Specification/wheel.html. (Note that the access string http:// is not required because the browser will fill that in.) The translation is performed by prepending the alias associated with the referrer's page, Engineering, in this case, to the path of the embedded link.

Absolute path links are full URLs, such as http://engineer.abcd.com/Performance/testdrive.html and require translation only if they point to a server that is in document control server 12's Alias table. The example link will get translated because it points to the server engineer.abcd.com that exists in document control server 12's Alias table as Engineering. The translation is done by replacing the intranet server's name by the document control server 12's server name, followed by the alias of the intranet server. In this example, the translated URL would be http://www.<server 12 ID>.com/Engineering/Performance/testdrive.html.

Links that point to pages on servers unknown to document control server 12 are not translated because they may well point to valid external sites, such as Yahoo, which should be left untouched. In one embodiment, therefore, these links are not translated. (Note that if the referrer's page came in through the Secure Socket Layer (SSL), i.e., the URL starts with https://, then the translated links will also have https://.)

On the other hand, such links could pose a security threat. That is, the link could be pointing to an intranet server that contains sensitive information, whose existence should not be revealed to external users. To counter this, in one embodiment document control server 12 includes a list of links which should be hidden from the outside world. Links found on such a list would be translated to something innocuous.

Redirection

When a page has moved, an intranet server may send a redirect status back to document control server 12. This means that document control server 12 has to translate the redirected address, similar to how embedded links are handled, before forwarding it to the client browser.

Architecture

Figure 4:
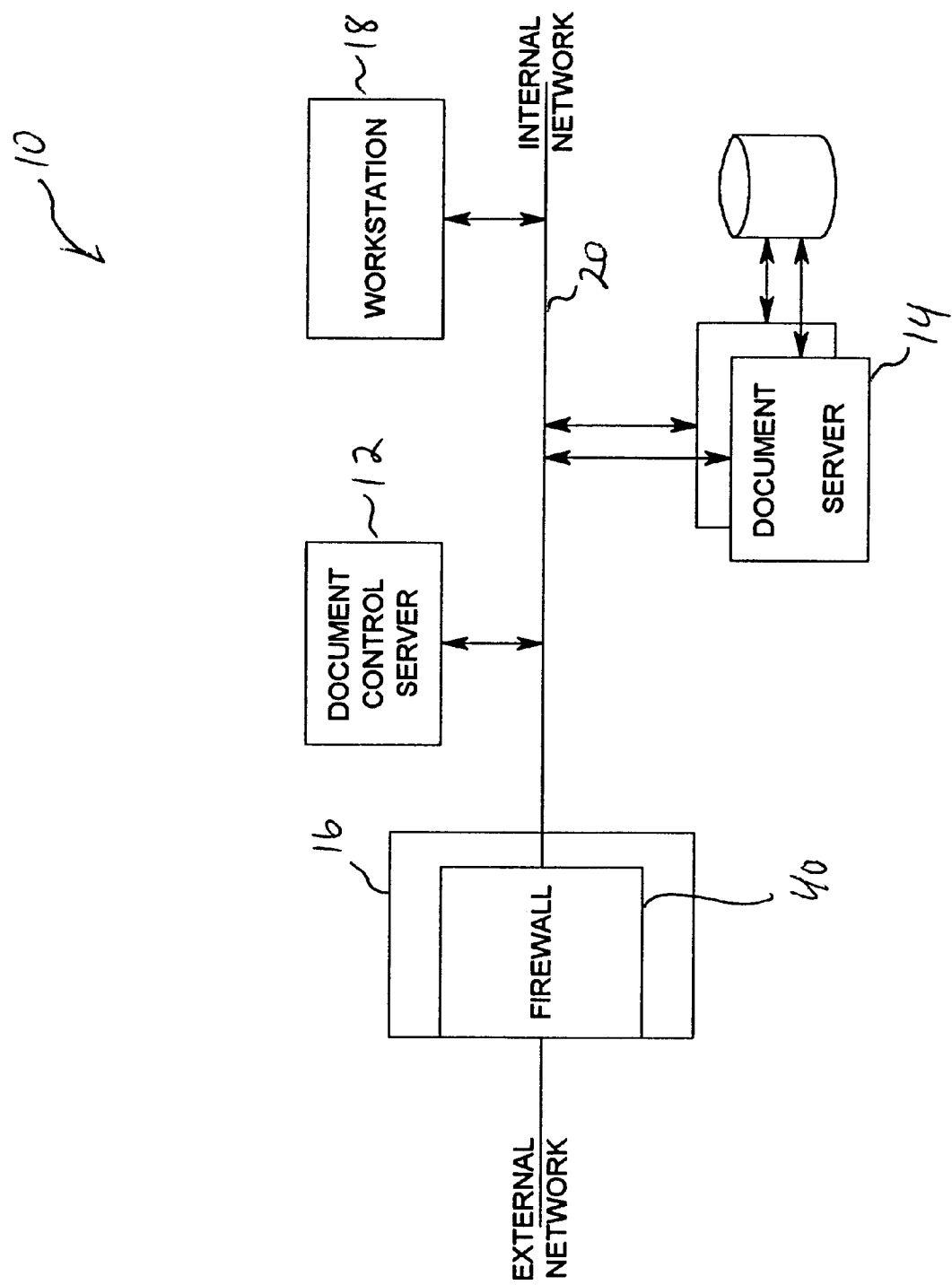
FIG. 4 is a document access system which includes a firewall.

A document access system such as system 10 illustrated in FIG. 1 enables users to grant outside organizations direct access to internal web data in a secure, simple and manageable way. It is essentially a secure window through which outside partners can view internal web data. If, as is shown in FIG. 4, external interface 16 includes a firewall 40, system 10 also provides authenticated, authorized and view-customized business partner access to key Intranet servers via a standard web browser. Such a system enables users to easily, but accountably, grant authenticated partner access to internal web data, with complete control and authorization. Outside partners need only access a predefined URL in order to access an internal web page.

Figure 5:
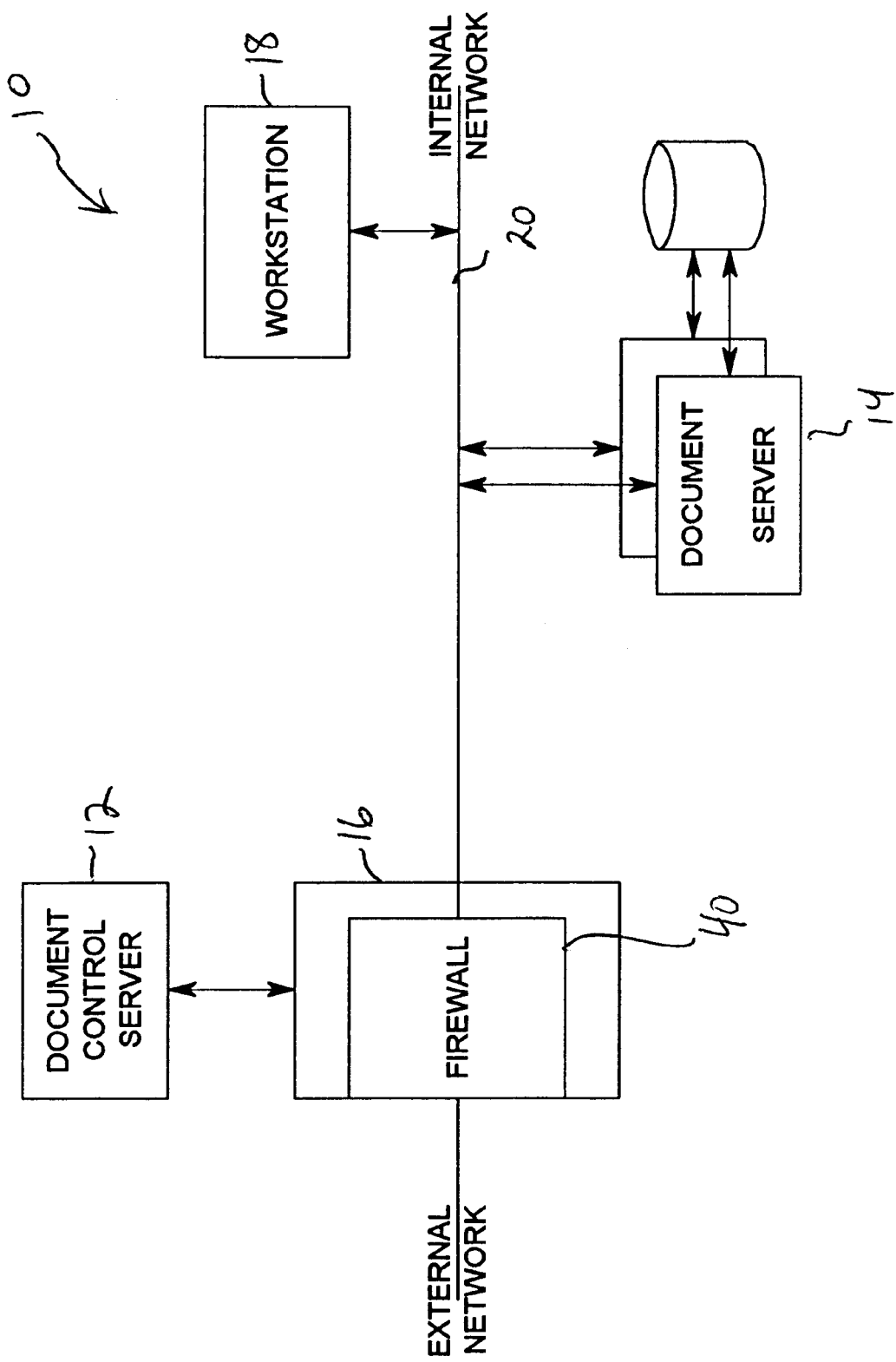
FIG. 5 is a document access system in which the document control server is placed in a third network.

In one embodiment, as is shown in FIG. 4, document control server 12 is installed inside firewall 40. In another embodiment, as is shown in FIG. 5, document control server 12 is installed on a third network. Either way document control server 12 authenticates the outside user and then routes the request to a hidden, internal URL. The entire process is transparent to the outside user, and easily defined by the internal document control server 12 user. This allows business partners direct access to the data, eliminating the time lag, redundancy, lack of integrity and the bottleneck within the MIS Dept. (Please note that if document control server 12 is installed inside the firewall as is shown in FIG. 4, firewall 40 must be configured to restrict HTTP requests from any external source so that they can only get through to server 12. Similarly, if document control server 12 is installed on a third network (as a type of demilitarized zone (DMZ)) as is shown in FIG. 5, firewall 40 must be configured to restrict HTTP requests into internal network 20 so that they can only come from server 12.)

Figure 6:
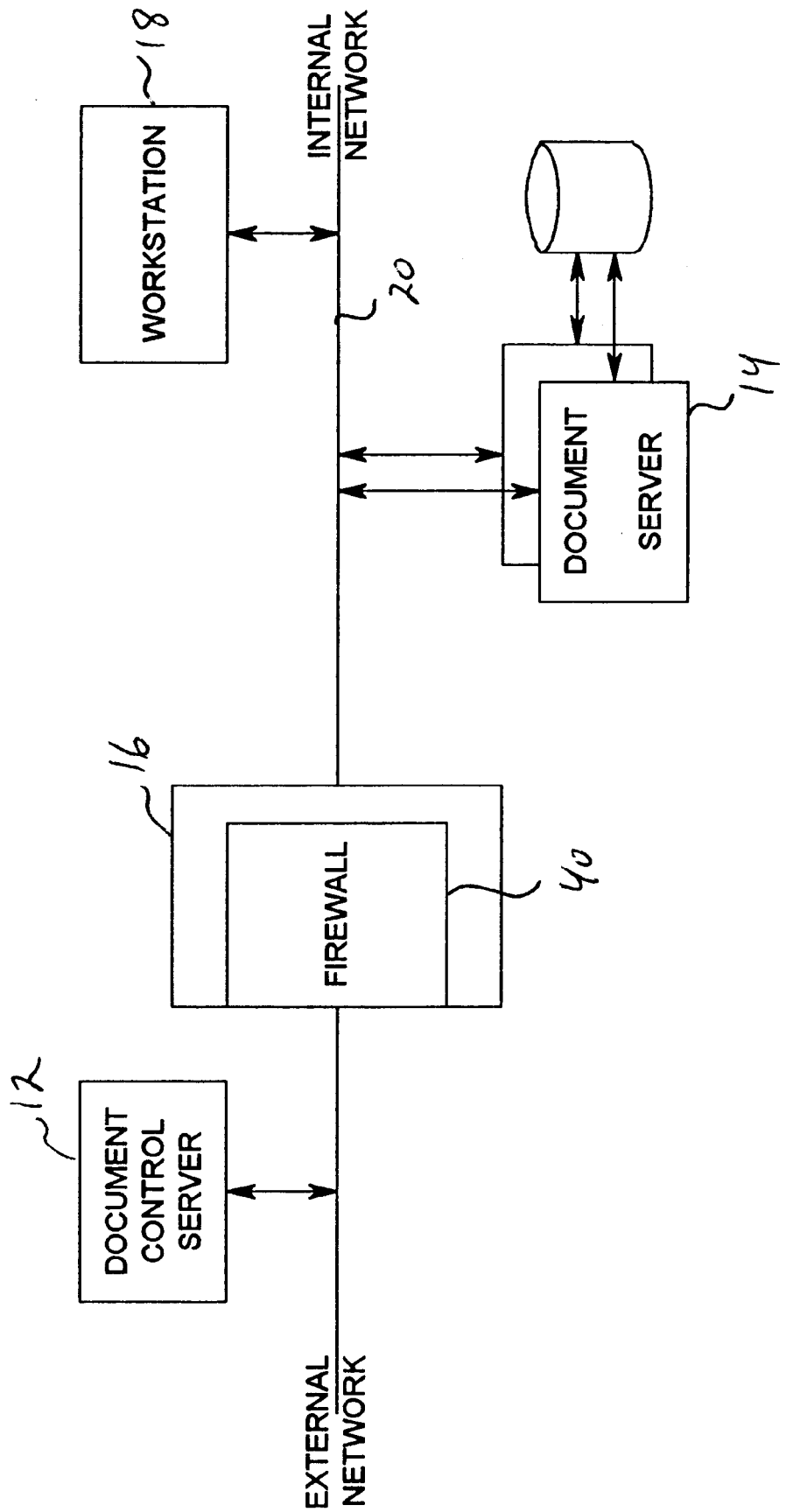
FIG. 6 is a document access system in which the document control server is placed on the external network.

In a third embodiment, such as is shown in FIG. 6, document control server 12 is installed outside firewall 40 and is accessed through the Secure Sockets Layer (SSL). Such an embodiment should be set up so that firewall 40 allows HTTP traffic only from document control server 12 into internal network 20.

To further reduce any bottleneck, in one embodiment document control server 12 includes the option for the actual "data owners" themselves to define which partners have access to selective internal data. A data owner is a trusted individual within the organization that is empowered to grant Business Partners access privileges to Web pages on document servers 16. In one such embodiment, a Data Owner is assigned to one or more "roles," where a "role" represents the mapping alias assigned to one or the servers 16. A Data Owner can only add Business Partners or map URLs for the server "role" to which the Data Owner is assigned.

For example, an employee working in the Accounting department would be assigned to an Accounting role (server). The Accounting Data Owner is only able to access the internal servers specified by the administrator. This prevents the Accounting Data Owner from mapping URLs on any other server such as the Marketing or Engineering servers.

Once a Data Owner has been assigned to a role, he or she is able to perform the following tasks:

Add, modify, or delete a Business Partner from that particular role

Establish a user ID and password for a Business Partner for basic authentication Post or map an internal URL for access by a Business Partner Delete URLs from a posted Go List Delegation of such tasks to the data owners frees up MIS while also delegating data administration to those who understand the information best. In such an embodiment, the system administrator also defines general authentication rules and the list of eligible document servers 16.

Business Partners are somewhat-trusted end users. They can be granted controlled access to selected Web page structures on internal Web servers(s) such as document servers 16 once they have been provided with the following information:

- A URL connecting them to document control server 12.
- A user ID and password to authenticate them to document control server 12.
- The name of the "menu tag" that they will select when they connect to document control server 12 that will retrieve the internal Web pages as specified by the Data Owner.

It is the Data Owners' responsibility to create and maintain a listing of Business Partners that require access to the intranet servers they control and provide the Business Partner with the information they will need to access the selected intranet server(s).

Every Business Partner defined by a Data Owner is part of a "group." The "group" a Business Partner belongs to is directly related to the role a Data Owner has been assigned and what internal servers are associated with that role. These groups control what URLs they are able to access on the internal servers.

A Business Partner can be assigned to multiple groups. For example, a Business Partner may belong to both the Marketing and the Sales groups. Data Owners manage their Business Partner accounts through the Business Partner list. From the Business Partner List, a Data Owner can establish a new Business Partner and modify or delete an existing Business Partner to any groups that they control.

In one embodiment, a Business Partner List is accessed by clicking on a BP List button on a Data Owner Administration utility window.

Figure 3:
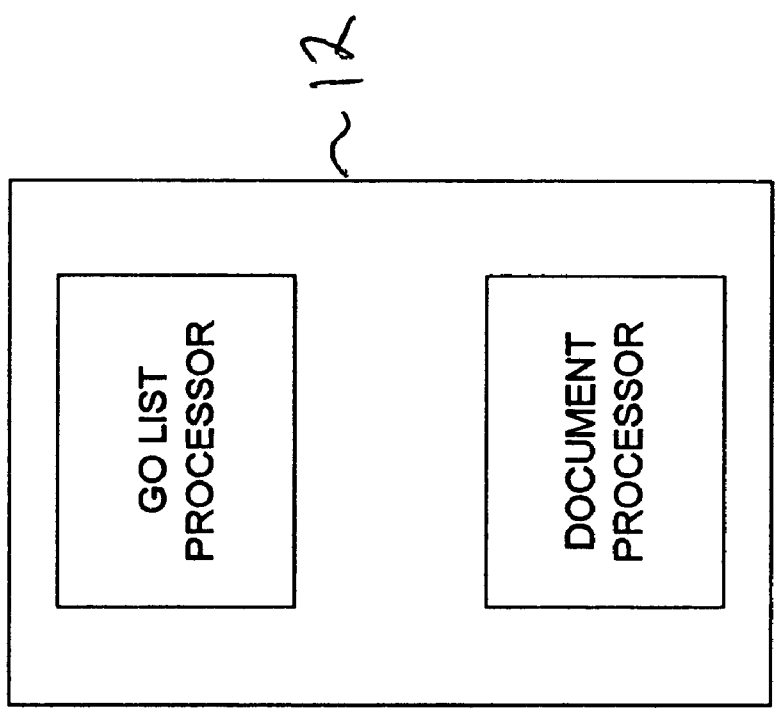
FIG. 3 shows a document control server which can be used in the document access system shown in FIG. 1.

In one embodiment, document control server 12 includes a go list processor 22 and a document processor 24 (see FIG. 3). Go list processor 22 determines if the user has authorization to access said first document. Document processor 24 reads a document from document server 14, cleans the document as detailed above and forwards a clean version of the document to the user. Go list processor 22 and document processor 24 will be discussed next.

a) The Go List

The Go list is used by the document control server 12 to determine which URLs an authenticated Business Partner may be allowed to display. The Go List is unique to each role. It is identified by the rolename.data within the roles/ directory. In one embodiment, the Go List is managed by MIS. Such an embodiment does not, however, take advantage of the flexibility provided by the architecture of the present invention. Instead, it can be advantageous to permit individual data owners to determine the URLs to be included in each Go List. Such an embodiment will be discussed next. In this example, documents are made available by the Data Owner and can be accessed by a user termed a "business partner (BP)".

In one such embodiment, the Go list contains data formatted as follows:

Real_url; MENU="menu_name"

where the Real URL is the actual URL (without the http://) used by document control server 12 to access that particular directory or file. The MENU parameter is always present. There can be a value within the quotes, or it can be empty. If there is a value within the quotes, then document control server 12 will parse that value up and set up a link to that particular URL with the title of the link being the Menu Name—if the Business Partner goes to its menu page after it logs in.

Only allowed URLs are present within the go list. No other URLs are included.

Also, the Go List will permit the Business Partner to access any of the files under a certain directory. For the time being, this is done by default on any URL that the user allows that ends with a "/"—to allow the Business Partner to access anything within the subdirectory—this is entered in the go list with the traditional '*' following the trailing slash. In one embodiment, the directory URL as kept intact and the Data Owner is given the option to cut and paste the path that the Data Owner wants the whole directory included in.

In such an embodiment Data Owners append the * to the directory name if they want everything within that directory accessible to the Business Partners within that role. In another embodiment, explicit "disallows" could be included to handle documents the Data Owner wants to except from inclusion in the list of accessible documents.

b) The Mapping Code on Document Control Server 12

The next portion of the whole mapping design is where a lot of the real work comes into play. There is some code within document control server 12 that gets called when the user (Data Owner) wants to map a particular server to the Go List. In one embodiment, a graphical user interface is used to select URLs and business partners. In one such embodiment, this code gets activated by the Data Owner performing one of the following tasks:

(A) Bringing up the Server Go List for the first time (B) Clicking on a Node within the Go List Mapping Tree that has not yet been expanded and may have some children node (C) Clicking on the Remap Button At this point the GUI communicates to Server 12 via a Get URL request. The Get URL request:

(A) indicates to the server to load the GO list for a particular role (B) checks to see if the node has not already been expanded and that the node exists on this server (the front part of the URL indicating the server name is consistent) and that the node is of an html type (or directory type)—if the node matches all of these criteria, then the GUI will indicate to the server to expand the particular URL for the particular role and (C) If the DO selects the Remap button, they are prompted to see if they want to remap that portion of the server down. If the DO selects yes, then a request to Remap with the currently selected URL and the role is sent to the server.

Server 12 then acts upon the request that it receives from the GUI (A) if the request was to load the GO list, then the server portion checks for the existence of a role_map.data file in the roles directory. If this file does exist, then all that is done is that file is sent to the GUI line by line as is. If the file does not exist, then the file is created and the mapping function is called. The mapping function is called with the file pointer, the name of the URL (the server name) to be mapped, and a depth indicator of 1. (NOTE: This embodiment includes an option to go down multiple layers, however due to timeout issues it may be better to just go down one layer at a time and let the user build the map as they see fit. If it goes down multiple layers than the mapping function must have the skills and capabilities to prevent the same URL from being mapped multiple times (the recursive nature of links and web spiders). The mapping code and its behavior is described below these ordered steps.)

Once the mapping code is done, then the URLs with their appropriate line syntax have been input and saved into the mapping file. The mapping file is then sent line by line to the GUI.

(B) If the request was to expand a node, the server code then calls the mapping function for the particular URL to be expanded. It opens up a temp file to be used to write the information into. It then calls the mapping code with a file pointer to this temp file, the URL to be mapped, and a depth of 1. (NOTE: same code called as in condition A, just different parameters). Once the mapping code returns, the file is communicated line by line to the GUI and then the file is removed from the system.

(C) If the request was to Remap a particular server or URL, then things get a little tricky. If the DO had chosen to remap the entire server, then the URL sent is the base URL—otherwise the URL sent was the URL that the DO wanted to remap from that point down. The same code is used regardless of the situation—just a different URL value. What happens is:

The current map file is copied over to the new map file until the line with the URL to be remapped is read in.

At this point this line is parsed to determine the depth in the tree (root level is 0).

A remap function is called which then does the following (note, that this is complicated by the fact that the tree could be at varying depths with files having been added or deleted and we would like to keep the prior shape and values of the tree when applicable)

Create a temp file to contain the intermediate results of the mapping

Call the map function with a pointer to the temp file, the URL, and a depth of 1.

It then compares the current map file line by line with the temp file.

If the URL at the current depth is not found in the respective depth in the new temp file, that URL and any URLs immediately following it with a depth greater than the current depth are removed (that initial file is missing)

If the URL at the current depth is found in the temp file, any URL lines in between the URL being searched for and the prior URL are new files and are added prior to the current URL in the map file. Their syntax lines indicate the current depth and default of disallowing that URL. Then the existing current URL line is left as is in the map file.

At this point the next URL in the map file needs to be examined, in examining this URL the URL line syntax is examined. The depth is the issue of primary concern. If the depth is the same as the current depth, then continue with this loop. If the depth is a depth deeper than the current depth, then this URL is a child of the prior URL and the prior URL then also needs to be remapped—the remap function is then called recursively with the prior URL. If the depth is less than the current depth, then we are no longer examining URLs that needed to be remapped and this function then returns.

After the final remap function returns, the remainder of the values are not to be touched and so they are copied over to the new map file as is.

After the server is done remapping, it then sends the whole newly mapped tree back to the GUI line by line.

(NOTE: the server also then recreates the Go list to reflect the new values, information on creating the Go list from the mapping information is below.)

Finally, the GUI reads in the lines of information it gets from the server.

For (A) an initially loaded server, the GUI will create a tree examining each line of input. This is described in section 3 of this summary.

For (B) an expanded node, the GUI will create children nodes immediately below the expanded nodes by setting the depth according to the new tree and parsing each line of input. The parsing of the lines of input is described in section 3 of this summary.

For (C) a remapped server, the GUI will delete the previous tree and re-create the new tree (similar to A).

The code that does the mapping is a set of code pieces that loads the URL, parses any HTML that is returned, and creates a chain of information regarding the links. It then searches however deep is desired on each of the links.

it uses some standard libraries to aid in parsing and getting the URL and HTML when it encounters a link, it stores that information in memory. At that time it also attempts to determine what sort of file it is—currently we only distinguish between the following: HTML, sound, graphic, external, video. It attempts to determine this based off of the hints surrounding it based on the filename and the surrounding html.

If the file is an HTML file and the mapping code has not yet reached the requested depth of mapping, the mapping code with then recursively try to bring up the HTML file and parse through its contents, etc.

As it comes across a file and finishes parsing it—it creates a syntax line that the GUI is expecting and writes this line to the file that it is passed. The line is as follows:

URL (ust a tag)

http://real_file_url (the is the URL to the file that the mapping code downloaded and parsed—this is the file that will be allowed or denied by the DO)

depth (an integer that is to indicate the current depth that this file is in the tree—the lines are listed such that the tree can be loaded via a depth-first sort of algorithm—it continues down the left hand side while the depth is getting bigger, adding children from left to right as the depth is the same, and going back up the tree as the depth becomes smaller)

filename (this is the name of the file for that URL—a * is used if the filename cannot be determined (like in the case of a directory or the server)

file type (this is a character which corresponds to the filetypes that were previously mentioned)

state of node (this is a character which indicates if this node was in a collapsed or expanded state when the tree was saved—this is used by the GUI only, the mapping code always defaults this to C)

allowed (this is a character which indicates if this URL is to be allowed or disallowed, the mapping code defaults this to disallowed)

status of attaining the link (this is the HTTP status code of trying to access this link it could have a value of 200 which means it was accessed OK, 404 meaning that this URL was not found, or a 0 indicating that this was not accessed)

already mapped (this is a one character flag used to indicate if this URL was already mapped and exists previously in the tree or not, this is most useful in a multi-depth mapping search).

Finally, the server has one more responsibility with respect to the mapping code. The server must handle writing out the saved data from the GUI when the DO requests to save the data. At this point, the data that is posted from the GUI to the server is written out line by line into the map file again. After this is done, the server deletes the prior Go List and parses through the map file a line at a time determining if that line is allowed. If the line is allowed the real_url part of the Map line is added (minus the http://) to the Go List. Next, the server checks the line to see if a "Menu" tag has been appended, if so, the server then adds the appropriate Menu tag to the Go list. Otherwise, it just adds a null menu tag to the Go list. As mentioned previously, currently if the real_url ends in a '/' an '*' is appended to the end of the real_url line to indicate that the user can access the entire directory—see Section 1 for further information.

After the Go List has been saved, the server is re-initialized with the new values—thus allowing immediate access or denial of access to the Business Partners for that role.

The Directory Map with the GUI

Figure 7:
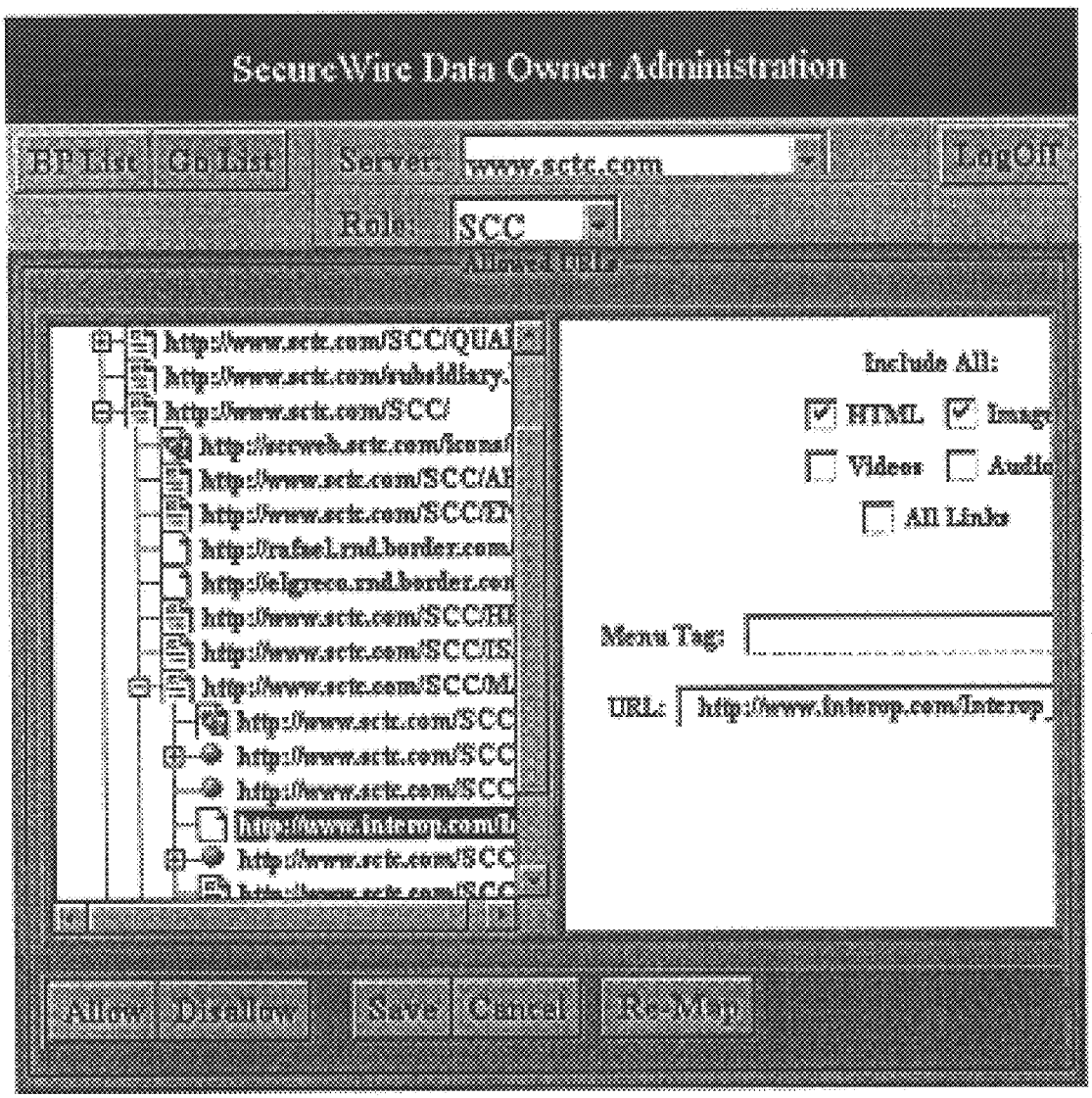
FIG. 7 is an example of a tree structure representation which could be used to aid the data owner in the selection of permitted URLs.

As mentioned previously, in one embodiment the GUI reads in and interprets the given line in order to creating nodes to represent the mapped server as a tree structure to the DO. Once such tree structure can be seen in FIG. 7.

The GUI communicates with server 12 as previously discussed and gets back well-defined lines of data. It parses the data and creates a node for each line provided by the Go list. It then looks at the expanded and collapsed feature to determine whether that node should be expanded or collapsed. It also looks at the file type to associate an image with that node. This image should allow the user to better determine what sort of nodes they are giving the Business Partners access to. The image is also determined by the return status from the mapping process—if a status of 404 is specified, then that link is determined to be broken (at least from document control server 12) and a broken link icon is displayed next to it. Finally, if that node is currently allowed, then the green ball is displayed next to it—to given the illusion of "green light means Go" to the DO.

The directory tree is created in a depth first fashion. It reads in each line examining the current depth. If the depth of the new node to be inserted is greater than the current depth than the node is inserted as a child of the previously inserted node. If the depth is the same, than it is inserted as a sibling. If the depth is less, then the tree is parsed back until the depth of the tree is at the same value of the depth and the node is inserted as a sibling at that level. The server is considered to be at the root level and thus has a depth of 0.

The text value that shows up with the node in the tree is the real_url value minus the http:// appended by the Menu Tag and Value if there is one for that node. A node may have a menu tag without being allowed.

The Data Owner (DO) can then traverse the tree examining the various links and determining what to allow and what to disallow. If they allow a directory—everything beneath that directory will be allowed. There currently is no mechanism for handling exceptions yet. If they allow files, then that file is allowed. If they have checked any other "include on allow" options (currently we offer, include all Gifs, Audio, Video, HTML, All Links)—then the files immediately beneath (once again only one layer deep) are automatically turned to allow if they are of the corresponding type. One note is that external files will never be "allowed"—as they do not exist on the server and thus it does not make sense for the DO to be allowing or disallowing those files.

When a data owner selects a link, they have the option of specifying the menu tag to be shown. If they do not specify one, then it is left blank. If they do then it is assigned for that node only. In order for it to get assigned to that node, the DO will have to select Allow or Disallow.

When Data Owners have finished making their changes they can save or cancel their mapping values. If they cancel then nothing that they did since their last save or remap will be saved. If they hit save, the values are communicated back to the server and the map file and the Go List Pile are updated as described previously.

Installation

Prior to Install:

Before fully installing and configuring document control server 12, the customer must have a digital certificate (for SSL encryption or transmissions) as well as set up and configure a server such as Internet Information Server (on NT) or Netscape Enterprise Server (on UNIX Solaris).

Installations:

MIS installs document control server 12 onto the IIS or NES server and configures the firewall to allow HTTP access to the document control server 12 server.

Definition of End Users:

Document control server 12 offers organizations the option to delegate administration to end users who control the actual data (Data Owners) rather than forcing more work onto MIS. The data owner's access is defined by the network administrator. The data owner then maps which servers can be accessed. This data is stored in the document control server 12 "go list." The program code implementing document control server 12 is now completely installed, and ready for use.

Define Business Partner Access:

At this point, in order for an outside partner to access data, he/she must be granted access by the data owner. The data owner simply accesses the document control server 12 "data owner" GUI via a standard Java-enabled web browser. He/She can then define the new partner via role-based administration or explicitly choose which URLs may be accessed.

Outside users will not have access to any internal URL that is not specifically listed, even if there are embedded links in a URL for which access was granted. However, users can define access to a particular URL and all sub-pages as well.

Future Partner Access:

After one role has been defined, future partners need only be added to that role, rather than requiring a whole new access to be defined.

Business Partner Access:

All the outside partner has to do is type in the defined URL with any standard web browser. The partner will then be prompted for a user ID and password. Once these are entered, the partner will see a list of accessible URLs.

Back End Databases

It is important to understand that document control server 12 simply passes HTML information. This means document control server 12 does not have a problem passing CGI scripts and other dynamic content. Where this becomes particularly confusing is the access and authentication to back end databases via an application gateway.

One of document control server 12's greatest values is to allow outsiders access to ever-changing information such as order processing, shipping, etc. Much of this data is stored in large back-end databases with an application gateway on the front end. The application gateway puts an HTML front end on the database and allows Intranet users to query required information. Typically, a user only needs to enter a customer account number to access this information. However, in order to give outside users direct access, many organizations need to require some level of authentication to this process.

When document control server 12 passes an outside partner to any Intranet URL, the user is authenticated as a unique document control server 12 user, however, that user ID is not passed on to the Intranet server. Therefore, direct access to back end databases cannot be defined for each document control server 12 Business Partner. It will be necessary to create an HTML-based sign-in screen. This is a simple process and offers an opportunity for resellers and professional services to add value to the product sale.

Many Internet web servers handle restricted access in slightly different ways. If the user is not known, the web server responds with a 401 error. The user's browser then displays a standard screen requesting user ID and password. The user types these in and is granted access.

It is important to understand that document control server 12 cannot process this transaction. For security reasons, only HTTP traffic can pass through document control server 12. Any authentication must be HTTP based, as mentioned above.

In one embodiment, document control server 12 is installed on a standard web server running IIS (NT) or NES (Solaris). It requires no changes to the current infrastructure, and no "agents" or "clients" to be installed on any web servers or browsers.

Administration and data owner usage is accessed via document control server 12's Java user interface. This allows access via any web browser that supports Java (e.g., Internet Explorer 4.0, Netscape 4.0). Outside partner access is also accomplished via a standard web browser.

Operating with Third Party Firewalls

Document control server 12 can be used in conjunction with a firewall to add an additional layer of security to Business Partner communications via the Web. Two components need to be considered when determining the location of document control server 12: Domain Name Service (DNS) and routing.

Depending on the deployment option preferred and the capabilities of firewall 40, there are up to four different methods for routing traffic to, and through, server 12:

1) Redirected proxy—For added security on external to internal connections, a redirected proxy can be configured on your firewall to redirect the inbound connection requests. When a Business Partner on the external network attempts to connect to document control server 12, firewall 40 intercepts the request and establishes a connection to server 12. This rerouted connection hides the actual destination from the Business Partner requesting the connection.

2) Transparent proxy—A transparent proxy can be set up through firewall 40 to document control server 12. From the Business Partners' perspective it will appear as though they are connecting directly to server 12 and not connecting to the firewall first.

3) Directly to document control server 12—If document control server 12 is installed on the external side of firewall 40 (as in FIG. 6), connection requests will be routed directly to server 12. In such an embodiment, server 12 authenticates the Business Partner, and passes the request through firewall 40. Firewall 40 then retrieves the requested Web page(s) from the specified document server 16.

4) Through a third network—(some firewalls allow a "third network" capability, (sometimes called the DMZ or the Secure Server Network). The three deployment scenarios discussed above still apply in a "three network" environment; however, additional firewall configuration is necessary to ensure that the required name resolution (DNS), and routing are still possible.

Security Features

SSL Encryption.

In one embodiment, data transmitted between the partner and web server is SSL-encrypted to prevent a sniffer from gathering information from the connection.

Document Control Server 12 Server Encrypted.

Data stored on document control server 12 server such as user IDs, the go list, and partner profiles are all encrypted to prevent unauthorized access.

Password and User ID Authentication.

In one embodiment, document control server 12 supports password and user IDs for authorization. Stronger encryption could also be used.

Granular Access Controls

Business partners can only access internal URLs to which explicit access is given. If an accessible URL has embedded links to pages to which explicit access has not been granted, the partner cannot connect to them. However, if an embedded link is to an outside server, such as www.yahoo.com, in one embodiment access will not be restricted.

Internal URLs and IP Address Are Hidden

To ensure the security of the internal network and web pages, internal URLs and IP addresses are hidden from outside access. Partners type in a predefined URL and are presented with a list of accessible internal URLs. When a link is selected from the list Document control server 12 then maps to the internal URL. The internal URL and IP address are never displayed for the partner to see.

System Requirements, Compatibility and Performance

Considerations for performance and reliability include amount of cache memory, CPU power, BUS speed, amount of RAM, speed of memory chips, bus architecture (IDE, EIDE, PCI etc.), hard drive capacity, and hard drive quality (seek and access speeds). The following table identifies the basic characteristics of minimum, recommended and ideal server configurations to run document control server 12.

| System Component | Minimum | Recommended | Ideal |
| --- | --- | --- | --- |
| CPU | Pentium 166 | Pentium 200 | Pentium Pro 200 |
| RAM | 32 MB | 48 MB | 64 MB |
| Hard disk | 1 GB | 2 GB | 4 GB |
| Platform | IIS 3.0 (NT 4.0) or NES 3.0 (Solaris 2.5.1) | | |
| Browser | Java enabled web browser MS Internet Explorer 4.0 or higher Netscape Navigator 4.0 or higher with Netscape's JDK 1.1 patch | | |
| Other | CD-ROM, 3.5" diskette, Color monitor, Keyboard, Mouse | | |

Document control server 12 enables users to easily, but accountably, grant authenticated partner access to internal web data, with complete control and authorization. Outside partners need only access a predefined URL in order to access an internal web page.

The following examples provide a better idea of how document control server 12 can be used to meet a variety of needs.

EXAMPLE

Manufacturing (Order Processing)

Manufacturing companies process thousands of orders every day. In order to keep up with competition and to achieve the highest levels of quality, customers/partners need to know the immediate status of an order to the minute. Many companies today have moved to just-in-time inventory systems to reduce overhead and costs. Document control server 12 can grant access directly to an order-processing page that connects directly into an order-processing database. The order-processing agents (data owners) can define what data customers/partners have direct access to. As a result, the customer knows immediately the status of an order. The supplier also saves money by eliminating the need to replicate data or take phone calls asking for updates.

EXAMPLE

Distribution

A distribution environment operates an order-processing and shipping department very similar to manufacturing. However, distribution also requires various types of information to be distributed to different partners, such as pricing and quantity breaks. Document control server 12 allows a company to customize the view each distributor or reseller sees, such as pricing or quantity breaks.

EXAMPLE

Financial Services

Financial institutions process millions of transactions a day with a large number of outside partners. These include the purchase and sale of assets as well as order/sale confirmation, etc. Today, many of these transactions require a third party to set up a secure certificate. Document control server 12 can speed up this entire process by allowing an agent to immediately allow an outside customer or partner access to trading information in minutes, and without the need for third-party intervention.

EXAMPLE

Health Services

Health care and insurance organizations process thousands of claims each day. Partners need a secure way to pass medical information and process it into a company's systems. For example, a doctor treats a patient who has Blue Cross/Blue Shield. That doctor needs to know if the patient's insurance covers the treatment, then process the claim after the treatment is given, and finally check on the status of payment once a claim is submitted. With document control server 12, Blue Cross/Blue Shield can give the doctor's office access to their internal list of insured patients, as well as the status of current claims. The company no longer needs to replicate this data to a DMZ or SSN Internet server or handle a phone call. The doctor's office can also securely fill out a web-based claim form over the Internet to process the claim for treatment.

EXAMPLE

Government Agency

It is necessary for various government agencies and departments to frequently share sensitive data. One example is the CIA and various law enforcement agencies. The FBI, DEA, ATF and other agencies must routinely check into the files of various personnel and public citizens. Typically, this requires these agencies to send a paper request for information to the CIA. The CIA must then search for the relevant information and then send a copy back to the requesting agency.

With document control server 12, the FBI and other agencies can be given direct access to the CIA files that might be relevant such as histories and fingerprint analysis databases. This can save time and money.

Document control server 12 offers several advantages over current methods such as cost savings, improved customer service and leveraging of the current infrastructure. Current methods for passing data to outside partners are expensive, slow and unreliable. Document control server 12 offers the information to partners faster, easier and cheaper. It also more tightly integrates partners, thus improving business relations. Document control server 12 also leverages the benefits of current technology such as the Internet and Intranet.

Other business advantages of document control server 12 include: it reduces overhead and costs; it eliminates the need to copy content to a web server within the DMZ or external network; it offers spontaneous, dynamic user-managed content; it eliminates the wait for an IS manager to update data or post on a web server; it eliminates integrity and replication issues; it more tightly integrates partners; and its open architecture allows access without the need to alter current technology.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of limiting access from an external network to documents stored on an internal network, the method comprising the steps of:

building a client list, wherein the step of building a client list includes the step of assigning each client to a role;

building a document list naming documents available to clients assigned to the client's role;

receiving a request for a document stored on the internal network;

associating the request with a client;

comparing the requested document to the documents available on the document list; and if the requested document is in the list of documents available to a client in the client's role, fetching the requested document as a proxy and sending the requested document to the client.

2. The method according to claim 1, wherein each document has a unique URL and wherein the document list includes the URL of each available document, wherein the step of comparing includes the step of determining if the URL of the requested document is included in the document list.

3. The method according to claim 2, wherein the step of building the document list includes the step of displaying available documents in a tree structure within a graphical user interface, wherein the step of displaying includes the step of querying a document control server to obtain a current version of the document list.

4. The method according to claim 1, wherein the step of associating the request with a client includes the step of authenticating the client.

5. The method according to claim 4, wherein each document has a unique URL and wherein the document list includes the URL of each available document, wherein the step of comparing includes the step of determining if the URL of the requested document is included in the document list.

6. The method according to claim 5, wherein the step of building the document list includes the step of displaying available documents in a tree structure within a graphical user interface, wherein the step of displaying includes the step of querying a document control server to obtain a current version of the document list.

7. A document control system, including:
an internal network;
an external interface;
a document server connected to the internal network, wherein the document server controls access to a plurality of documents, including a first document; and
a document control server connected to the internal network and to the external interface, wherein the document control server receives a document request from the external interface for the first document, determines a user associated with the document request and authenticates the user, wherein the document control server includes a go list processor for determining if the user has authorization to access said first document and a document processor for reading the first document from the document server, cleaning the first document and forwarding a clean version of said first document to the user.

8. The document control system according to claim 7, wherein the external interface includes a firewall connected to an external network.

9. The document control system according to claim 7, wherein the document processor acts as a proxy to hide access to the first document.

10. The document control system according to claim 7, wherein the external interface includes a telephone interface into which a business partner can dial to gain access to the document control server.

11. A document control system, including:
an internal network;
an external interface;
a document server connected to the internal network, wherein the document server controls access to a plurality of documents, including a first document;
a document control server connected to the internal network and to the external interface; and
a data owner interface for building a document list of available documents;
wherein the document control server receives a document request from the external interface for the first document, determines a user associated with the document request and authenticates the user; and
wherein the document control server includes a go list processor for determining, based on the document list, if the user has authorization to access said first document.

12. The document control system according to claim 11, wherein the data owner interface includes a graphical user interface which displays the document list in a tree structure, wherein the graphical user interface queries the document control server to obtain a current version of the document list.

13. The document control system according to claim 11, wherein the document control server further includes a document processor for reading the first document from the document server, cleaning the first document and forwarding a clean version of said first document to the user.

14. The document control system according to claim 13, wherein the document processor acts as a proxy to hide access to the first document.

15. The document control system according to claim 14, wherein the data owner interface includes a graphical user interface which displays the document list in a tree structure, wherein the graphical user interface queries the document control server to obtain a current version of the document list.

16. The document control system according to claim 11, wherein the external interface includes a firewall connected to an external network.

17. The document control system according to claim 11, wherein the external interface includes a telephone interface into which a business partner can dial to gain access to the document control server.

* * * * *

UNITED STATES PATENT AND TRADEMARK OFFICE
CERTIFICATE OF CORRECTION

PATENT NO. : 6,640,307 B2
DATED : October 28, 2003
INVENTOR(S) : Viets et al.

It is certified that error appears in the above-identified patent and that said Letters Patent is hereby corrected as shown below:

Title page,
Item [56], References Cited, OTHER PUBLICATIONS, "Atkinson, R.," 1st reference, delete "http/ds" and insert -- http//ds --, therefor; "Atkinson, R.," 2nd reference, delete "Payloid" and insert -- Payload --, therefor; and delete "http/ds" and insert -- http//ds --, therefor; "Atkinson. R.," 3rd reference, delete "http/ds" and insert -- http//ds --, therefor; "Badger, L., et al.," reference, insert -- IEEE -- after "1995"; "Goldberg, D., et al.," reference, delete "Wave" and insert -- Weave --, therefor; "Greenwald, M., et al.," reference, delete "Surg" and insert -- SURF --, therefor; "Haigh, J.T., et al.," reference, delete "Nointerference" and insert -- Noninterference --, therefor; and insert -- IEEE -- after "1986"; "Karn, P., et al.," reference, delete "Transforms" and insert -- Transform -- , therefor; and delete "http/ds" and insert -- http//ds --, therefor; "Loeh, S.," reference, delete "Loeh" and insert -- Loeb --, therefor; and delete "Architecturing" and insert -- Architecting --, therefor; "Metzger, P., et al.," delete "MD" and insert -- MD5 --, therefor; and delete "http/ds" and insert -- http//ds --, therefor; "Stadnyk" reference, delete "T" and insert -- I --, therefor; after "Stadnyk" reference, insert -- Stempel, S., "IpAccess - An Internet Service Access System for Firewall Installations," IEEE, 31-41, (1995) --; and "Stempel, C.," reference, delete "Stempel" and insert -- Stevens --, therefor.

Column 3,
Line 9, insert -- access -- after "unlimited".

Column 7,
Line 5, delete "servers(s)" and insert -- server(s) --, therefor.

Column 9,
Line 52, insert -- , -- after "this URL".

Column 10,
Line 37, delete "(ust a tag)" and insert -- (just a tag) --, therefor.
Line 38, delete "(the" and insert -- (this --, therefor.

UNITED STATES PATENT AND TRADEMARK OFFICE
CERTIFICATE OF CORRECTION

PATENT NO.    : 6,640,307 B2
DATED         : October 28, 2003
INVENTOR(S)   : Viets et al.

It is certified that error appears in the above-identified patent and that said Letters Patent is hereby corrected as shown below:

<u>Column 12,</u>
Line 13, delete "Pile" and insert -- File --, therefor.

Signed and Sealed this

Twentieth Day of April, 2004

JON W. DUDAS
*Acting Director of the United States Patent and Trademark Office*